Patented Aug. 28, 1928.

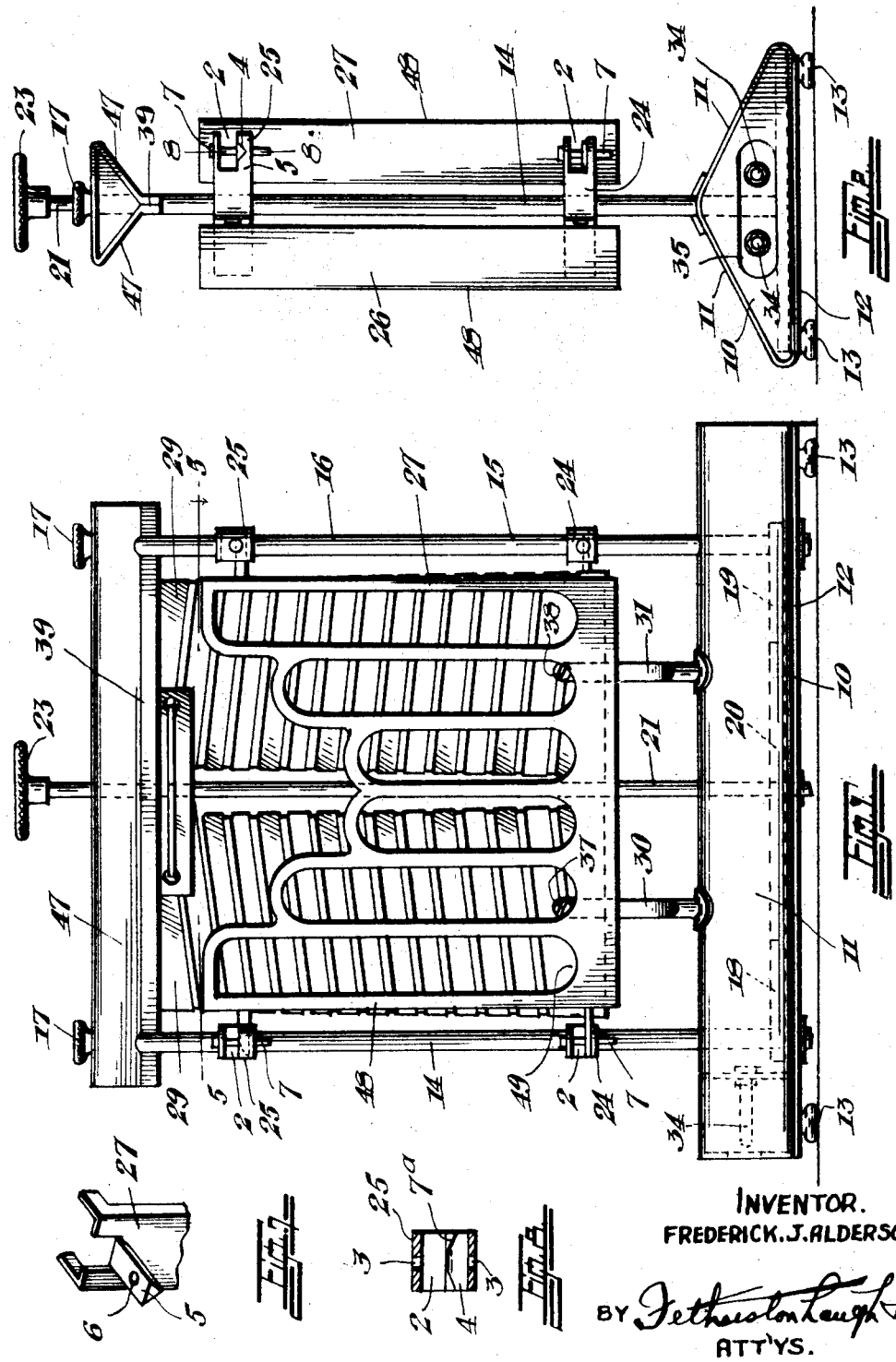

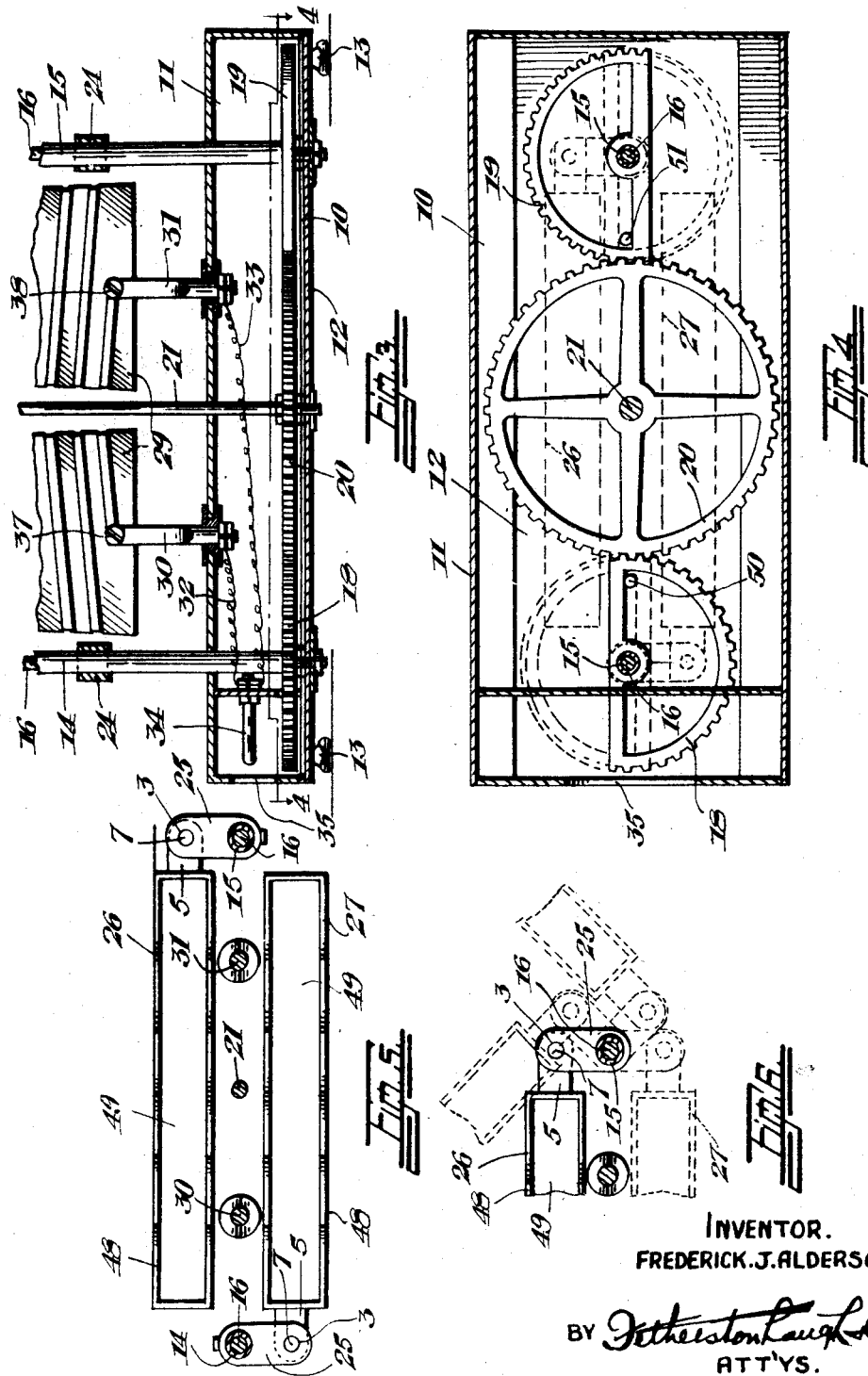

1,682,653

UNITED STATES PATENT OFFICE.

FREDERICK JACKSON ALDERSON, OF KINGSTON, ONTARIO, CANADA.

ELECTRIC TOASTER.

Application filed December 7, 1925. Serial No. 73,853.

This invention relates to improvements in electric toasters and more particularly to that type of toaster known as swinging-gate toasters and the objects of the invention are to provide a device of this character of simple and durable construction that can be manufactured at comparatively low cost.

Further objects are to provide an improved swing gate electric toaster with reflector means so arranged that the extent to which the bread carried by the gates is toasted is visible to an onlooker without moving the bread or operating the toaster.

Still further objects are to provide a reversible toaster of this description that will be of presentable and ornamental appearance, thereby adding to the equipment of the breakfast table.

With the foregoing and other objects in view, hereinafter more fully referred to, the invention consists essentially in the combination, with the heating element, of a pair of swingingly mounted, gravity locking gate members, one on each side of the element, designed to carry the bread to be toasted, the gates being supported on rotatably mounted posts connected to gears and rotatable by an operating rod member carrying a gear to mesh with the post gears, reflector plates at the top and bottom of the toaster designed to automatically indicate to an onlooker the extent to which the bread in the gates is toasted.

Referring now to the drawings in which like characters of reference indicate corresponding parts in each figure, Figure 1 is a front elevation of my improved toaster, Figure 2 is an end view, Figure 3 is a longitudinal section showing the elements and the electrical connections therefor, Figure 4 is a section on line 4—4 of Figure 3, Figure 5 is a section on line 5—5 of Figure 1, Figure 6 is a detail plan view showing, in dotted lines, the travel of the swingingly mounted gates, Figure 7 is a fragmentary detail view of the mounting for the gravity locking gates, and Figure 8 is a section on line 8—8 of Figure 2.

Referring now more particularly to the drawings, in which an example of my improved electric toaster is illustrated, 10 designates the base comprising a hollow casing, of substantially triangular shape with sloping sides 11 and flat bottom 12. This base is provided with suitable supporting buttons or the like 13 of well known construction. Suitably supported, within the base 10, are hollow gate-carrying posts, of any suitable form, 14 and 15, within which is the solid rod 16 rigidly secured to the bottom of the casing and secured at the upper extremity by the button members 17, while on the lower ends of the hollow posts 14 and 15 are mounted, within the base 10, the hollow half gears 18 and 19. These gears are designed to mesh with a full gear 20 carried by the operating shaft 21 centrally arranged between the gate supporting posts 14 and 15. On the top of the shaft 21 is an operating button in the form of a cap 23 rigidly secured thereto, while similar buttons or caps, of lesser size, are provided for the rods 16.

It will thus be seen that on the central shaft being turned or rotated through the member 23, the gear 20, meshing with the gears 18 and 19, will rotate, causing them to rotate the posts 14 and 15. Rigidly secured to the posts 14 and 15, at right angles thereto and in any suitable manner, are the gate supporting arms or links 24 and 25. These arms are adapted to support the gates in such a manner that when swung they will automatically align on opposite sides parallel with and slightly spaced from the heating element. As illustrated more particularly in Figures 1, 2, 7 and 8, the arms or links 24 and 25 are designed to pivotally support the gates and permit them to operate by gravity to lock into open and closed position and to this end are formed with slots 2 in their outer ends provided with holes 3 therethrough. On the under face of the slotted end and substantially midway thereof is a V-shaped groove 4 designed to engage with the V-shaped hinge members 5 of the gates.

These hinge members are also formed with holes 6 adapted to register with the holes 3 in the supporting arms and to engage with pivotal pins 7 extending therethrough. The under face of the slotted portion is also formed with a semi-circular groove 7ª, see Figure 8, communicating at each end with the V-shaped groove 4 whereby, on the gates being swung, the V-shaped hinge travels upwardly from the slot 4 into the slot 7ᵃ and then downwardly by gravity and again into the slot 4 to automatically lock the gate. This semi-circular groove is preferably shallower at its inner periphery than it is at each end so that, on the gate being swung, the V-shaped hinges 5 will automatically travel out of locking engagement with the groove 4 upwardly, raising the gates at the same time, into the groove 7ᵃ and then by gravity downwardly again into the groove 4 into locking position. The gates, therefore, on being operated through the member 23 will not only be swung but also, at the same time, automatically raised out of locked position to return at the end of their swing to another locked position. This is a feature of my invention the advantages of which will be apparent for automatically retaining the gates in exact parallel position on each side of the heating element 29.

The heating element 29 is of well known construction and, as illustrated in Figure 3, is designed to form a vertically extending wall between the gate posts 14 and 15. The element in order to permit free operation of the member 21 is also divided in the centre and is preferably, as illustrated, supported on terminal posts 30 and 31 extending through the base and in turn connected through wires 32 and 33 to the terminal members 34, accessible at the end of the base 10 through the plug receiving opening 35. The upper end of the heating element 29 is secured in any suitable manner to the top 39.

From the foregoing the simplicity of construction will be apparent and it will be noted that by simply unscrewing the terminal nuts 37 and 38 and also removing the caps 17 and 23, the device can be readily taken to pieces for packing or otherwise.

The rods 16 and the centre post 21 are designed to extend through a hollow top member 39 which is substantially triangular in cross section. The caps 17 retain the member 39 in position while the cap 23, on the shaft 21, extends beyond this member enabling the gates to be operated more easily.

An essential feature of my invention is the reflectors which comprise the highly polished slanting sides 11 on the base 10 and the oppositely slanting sides 47 of the top member 39. On the other hand the slanting sides could be adapted to receive mirrors of suitable formation. The slant of the reflectors in the top is arranged so that the inner surface of the bread or the like being toasted and opposite to the element will be visible to anyone sitting down adjacent the toaster while the reflector sides of the base are so arranged that the same result can be obtained by anyone standing up looking at the toaster. Furthermore, the sloping sides of the base perform a very important function by deflecting the crumbs and the like falling from the bread in the toaster gates onto the table on which the toaster is supported and away from the toaster. This is an important and practical result obtained by my improved construction as in toasters heretofore the crumbs invariably fell into the toaster and around the element.

With regard to the gates 26 and 27, it should here be noted that they may be made as disclosed in the present example of my invention with bread-retaining, skeleton pockets 48 formed by bending or folding the ends inwardly on themselves, the bread being designed to engage with the space 49 thus formed between the fold of the gate and the bend of the back portion.

In operation, the socket member being connected in the ordinary way to the source of electric supply to heat the element 29, the bread to be toasted is placed in the gates 26 and 27 to engage and to be retained therein by means of the pocket formation. The top and bottom reflector plates are arranged at angles opposed to one another and then disclosed when the inside of the bread, next the element, is sufficiently toasted without further interfering with the toaster, and, on this stage of the operation being reached, the button 23 is operated to in turn operate the gear 20 which operates the gears 18 and 19, turning the posts 14 and 15 and, with them, the gates 26 and 27 which, due to their pivotal mounting on the links 24 and 25, will cause them to swing around, the gate 26 swinging around to the side on which to take the place of the gate 27, reversing the surface of the bread to be toasted in connection with the heating elements, and the gate 27 swinging to the side of the toaster previously occupied by the gate 26, thereby turning the bread to be toasted by simply swinging the gates horizontally.

The reflectors or mirrors will then indicate when this other side of the bread is properly toasted and the gates can then be swung partially open to remove the toast. I also provide, in connection with the half gears 18 and 19, stops 50 and 51 to limit the travel of these gears on their being rotated by the centre driving gear 20.

As many changes could be made in the above construction and many apparently widely different embodiments of my invention, within the scope of the claims, constructed without departing from the spirit or scope thereof, it is intended that all matter contained in the present specification and drawings be interpreted as illustrative and not in a limiting sense.

What I claim as my invention is:

1. An electric toaster comprising a suitably formed, hollow base and a suitably formed top, turnable supporting posts in the base and extending through the top, half-gears keyed on said posts, a rotatable operating post intermediate of the supporting posts and extending through the top, a gear on the operating post adapted to mesh with the gears on the supporting posts whereby, on the operating post being rotated, the supporting posts are simultaneously and partially rotated, a gate formed with slice-retaining means swingingly connected to each of the supporting posts, a heating element on the base and means in the base and operable from without the base for supplying current to said element and means arranged in the base and top for reflecting the face of the gates opposed to the element.

2. In an electric toaster the combination, with a heating element, of a base formed with inwardly and upwardly sloping sides a head in spaced relationship to the base and formed with inwardly and downwardly sloping sides and reflector surfaces for said sides.

3. An electric toaster comprising, in combination with a heating element, a base, a top for the base spaced therefrom, rotatably mounted posts connecting the base and the top, a slice-carrying gate swingingly mounted on each of said posts and adapted, in normal position, to register with one another on each side of the element, a rotatable rod operatively connected to the aforementioned rods whereby, on the said rod being rotated, the gate-carrying posts are simultaneously and paritally rotated to swing the gates and reverse them to present the opposite sides of the gates to the heating element, said top and base being provided with reflectors to reflect the toasting surfaces of the bread or the like facing the heating element, means for automatically locking the gates at the end of their swing and means for automatically unlocking the gates on their being swung.

4. In an electric toaster the combination, with a reflector base of substantially triangular formation in cross-section and a reflector top of substantially triangular formation whereby the inner surface of material between the top and base is visible from different angles, a heating element therebetween, gates comprising turnable posts, a skeleton, slice-carrying gate, swingingly mounted on each post and adapted, on the posts being operated, to present first one side to the heating element and then the other side.

5. In an electric toaster the combination with a heating element and swingingly mounted automatically reversible toast carrying gates, of a base and head associated with the heating element and formed with oppositely arranged reflector surfaces whereby the surface of the bread to be toasted carried on the gates and opposing the heating element is reflected simultaneously upwardly and outwardly and downwardly and outwardly.

6. In a toaster the combination with a head and base adapted to reflect upwardly and outwardly and downwardly and outwardly respectively of intermediate and swingingly mounted automatically reversible means for carrying toast and the like, an intermediate heating element associated with the aforesaid means whereby the opposite surface of the bread to be toasted is automatically presented to the heating element and whereby the surfaces so presented are simultaneously reflected in the head and in the base and visible from below the toaster or from above the toaster.

In witness whereof I have hereunto set my hand.

FREDERICK JACKSON ALDERSON.